(12) United States Patent  
Putzolu (10) Patent No.: US 7,586,890 B2  
(45) Date of Patent: Sep. 8, 2009

(54) AIRLINK ALLOCATION IN A WIRELESS NETWORK

(75) Inventor: David M. Putzolu, Forest Grove, OR (US)

(73) Assignee: Intel Corporation, Santa Clara, CA (US)

(*) Notice: Subject to any disclaimer, the term of this patent is extended or adjusted under 35 U.S.C. 154(b) by 545 days.

(21) Appl. No.: 11/134,650

(22) Filed: May 19, 2005

(65) Prior Publication Data

US 2006/0262768 A1 Nov. 23, 2006

(51) Int. Cl.
*H04B 7/208* (2006.01)
(52) U.S. Cl. .................... 370/344; 370/319; 370/330
(58) Field of Classification Search ............ 370/208, 370/203, 336, 347, 465, 344, 468, 386, 389, 370/328, 334, 338, 341, 329; 375/260; 455/561, 455/562.1
See application file for complete search history.

(56) References Cited

U.S. PATENT DOCUMENTS

| 2003/0086366 | A1* | 5/2003 | Branlund et al. ............ 370/208 |
| 2004/0230325 | A1* | 11/2004 | Ramamoorthy et al. ....... 700/37 |
| 2004/0246937 | A1* | 12/2004 | Duong et al. ............... 370/345 |
| 2005/0053164 | A1* | 3/2005 | Catreux et al. ............. 375/260 |
| 2005/0268063 | A1* | 12/2005 | Diao et al. ................. 711/170 |
| 2005/0277444 | A1* | 12/2005 | Rensburg et al. .......... 455/562.1 |
| 2006/0034239 | A1* | 2/2006 | Abeta et al. ................. 370/341 |
| 2007/0004437 | A1* | 1/2007 | Harada et al. ............... 455/506 |

OTHER PUBLICATIONS

Kirkpartick et al., "Optimization by Simulated Annealing, Science", May 13, 1983; vol. 220, No. 4598.
Buckham et al, "Simulated Annealing Applications", Mechanical Engineering Department, University of Victoria, Nov. 18, 1999.
Nair et al., "IEEE 802.16 Medium Access Control and Service Provisioning", Intel Technology Journal, Aug. 20, 2004; vol. 08, Issue 03.
U.S. Appl. No. 11/075,030, filed Mar. 8, 2005, "Broadband Multicarrier Transmitter With Subchannel Frequency Diversity For Transmitting a Plurality of Spatial Streams", Li et.

* cited by examiner

*Primary Examiner*—Jean A Gelin
(74) *Attorney, Agent, or Firm*—Joseph P. Curtin; Cool Patent, P.C.

(57) ABSTRACT

Executing a simulated annealing process to lower a simulated system energy of a wireless network, the network having a plurality of clients and at least one base station with which the clients may communicate, and a media access control protocol layer supporting at least Orthogonal Frequency Division Multiple Access and Space Division Multiple Access, the simulated system energy based at least in part on reported co-interference between a pair of clients; and computing an allocation of a client of the wireless network to a region within a sub frame of an air link frame of the wireless network, the sub frame including a time slot and a sub-channel frequency range, the allocation based at least in part on a result of the simulated annealing process.

25 Claims, 3 Drawing Sheets

AIRLINK ALLOCATION IN A WIRELESS NETWORK

BACKGROUND

Wireless networking systems are well known and include, among many others:

i. WiFi or 802.11a and 802.11b systems, described in IEEE Std. 802.11, IEEE Standard for Information Technology—LAN/MAN—Specific requirements—Part 11: Wireless LAN Medium Access Control (MAC) and Physical Layer (PHY) specifications, IEEE, 1999; IEEE Std 802.11A-1999, Information Technology—Telecommunications and Information Exchange Between Systems—LAN/MAN—Specific Requirements, IEEE, 1999; and IEEE Std. 802.11B-1999, IEEE Local and Metropolitan area networks—Specific requirements—Path 11: Wireless LAN Medium Access Control (MAC) and Physical Layer (PHY) specifications: Higher Speed Physical Layer (PHY) Extensions in the 2.4 Ghz band, IEEE, 1999.

ii. WiMAX or 802.16d/802.16e systems, described in IEEE Std. 802.16-2004, IEEE Standard for Local and metropolitan area networks Part 16: Air Interface for Fixed Broadband Wireless Access Systems, IEEE, 2004; IEEE Draft standard 802.16e/D6, Part 16: Air Interface for Fixed and Mobile Broadband Wireless Access Systems Amendment for Physical and Medium Access Control Layers for Combined Fixed and Mobile Operation in Licensed Bands, IEEE, 2005.

(referred to herein as 802.16)

In general, such systems allow client devices including personal computers, laptop computers, game systems, portable digital assistants (PDAs) and "smart" mobile telephones, among many others, that are equipped with integrated or peripherally connected wireless network adapters, to inter-communicate or to communicate with a central access point or base station without a physical wire. In some protocols such as 802.16, clients may be also be termed subscribers or subscriber stations, but for generality, the term "client" is used herein. Such networks generally use a protocol that operates over a radio frequency channel, termed an airlink. As is well known, applications and higher level protocols may use a Media Access Control (MAC) protocol layer to manage the resources of the airlink and to provide a standard interface to protocol layers or programs executing at a higher level. In general, MAC layer implementations are designed to maximize available bandwidth and to minimize the likelihood of the occurrence of errors in communications over the network. Both the base station and client devices may participate in the execution of the MAC layer protocol and other network protocols to enable the operation of the wireless network. In general, it may be assumed that both a base station and a client have a protocol execution component, which may be a processor, a logic circuit or circuits, or a combination thereof. This protocol execution component may execute a hardwired protocol, or a program embodying a protocol that is stored in a memory or in other storage accessible from the protocol execution component, or both.

Orthogonal Frequency Division Multiple Access (OFDMA) is a well known technique providing improved efficiency in the utilization of the airlink. A MAC layer implementing OFDMA creates virtual two-dimensional regions for data communication along the dimensions of time and channel frequency. Each such region may be termed an airlink frame, or frame for brevity. In OFDMA implemented with time division duplexing, uplink frames and downlink frames are separated in time; in OFDMA implemented with frequency division duplexing, uplink and downlink frames occupy separate frequency channels at the same time. A MAC layer implementation may allocate regions of the airlink frame, or regions, to specific clients and reserve a region defined by a sub-channel and time-slot for communications from or to a specific client. This may be done either statically or dynamically depending on the rate of change of position of the clients relative to the base station, the bandwidth requirements of clients, co-interference between clients, and other factors.

Some wireless networking systems such as 802.16 based systems may implement Space Division Multiple Access (SDMA) in conjunction with OFDMA. In SDMA networks, advanced antenna systems (AAS) on the base station and clients allow for multiple, non-interfering communications on the same frequency region of the airframe in the same time slot. A MAC layer implementing OFDMA with SDMA may be thought of as organizing the airlink in three dimensions, with multiple two dimensional OFDMA regions available for each independent space division. Thus two different clients of an SDMA network may communicate with the base station using regions of the airlink frame that are overlapped in terms of both frequency and time.

DETAILED DESCRIPTION

Figure 1:
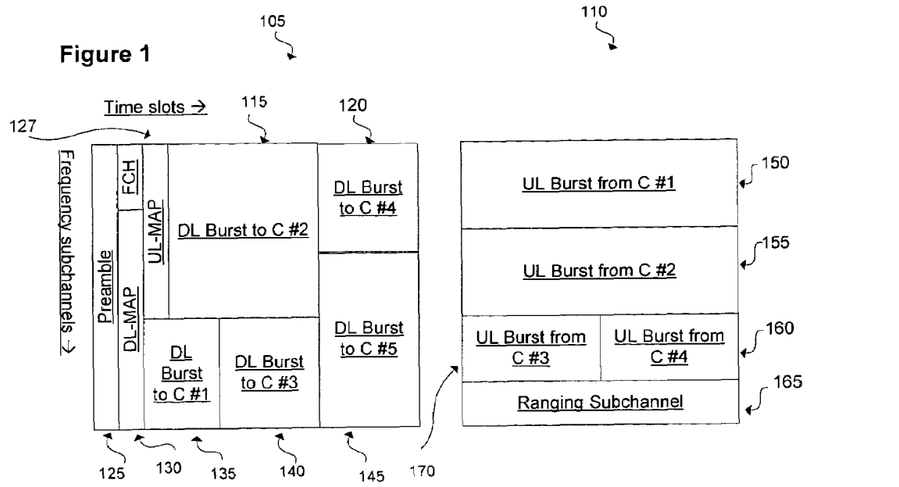
FIG. 1 depicts the organization of the airlink for an OFDMA implementation of a wireless network using time division duplexing.

FIG. 1 represents the organization of the airlink in an OFDMA scheme using TDD in an 802.16 embodiment. The frequency width or channel allocated to the airlink is depicted along the vertical axis of the figure and time is depicted along the horizontal axis. Airlink frames, each further subdivided into two sub-frames as shown at 105 and 110 are transmitted at regular intervals between the base station and a client. On the left is the downlink sub-frame 105 of the airlink frame, including communication of symbols from the base station to a plurality of clients; on the right is an uplink sub-frame 110 used for the communication of symbols from the clients to the base station. A block such as the downlink sub-frame is then divided by the protocol into regions 115 through 145. (The term region is used herein to describe any sub-division or region of an airlink sub-frame smaller than the entire sub-frame, including one that may be further divided into smaller regions, or alternately, one that is not further sub-divided but only contains symbols). Some regions 125, 130 and 127, are management frames to allow the base station to communicate the organization of the airlink to clients. These include, for example, the downlink (DL) map 130, the uplink (UL) map 127 and preamble 125. The remaining regions of the downlink frame 105 such as 115, 120, 135, etc. are data frames and may contain symbols being transmitted from the base station to the client (downlink regions). For example, the region 115 is a downlink burst, or symbol transmission, to client 2 (C #2), and the region 145 is a downlink burst to client 5. Similarly, the uplink frame 110 may contain uplink regions containing data transmitted from the clients to the base station (uplink regions), 150-160 and 170, as well as other administrative data, e.g. the ranging sub-channel 165. A similar arrangement may be used in frequency division duplexing (FDD).

Figure 2:
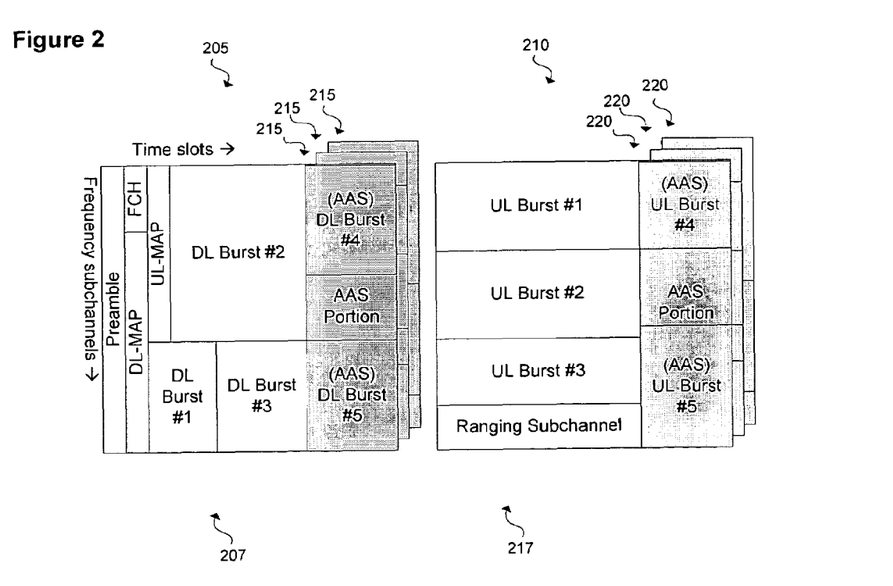
FIG. 2 depicts the organization of the airlink for an OFDMA implementation of a wireless network with SDMA using TDD.

FIG. 2 represents the organization of the airlink in an embodiment exemplified by the 802.16 MAC protocol. In the depicted embodiment, the organization of the airlink is based on OFDMA and SDMA. As in FIG. 1, a TDD scheme is depicted in this example, with an airlink frame 205 for uplink data and another 210 for downlink data. An equivalent FDD scheme may also be used, as is known in the art. Each frame is further subdivided into a Space Division multiple access region and a region that is not Space Division multiple access (or a non-Space Division multiple access region). In the downlink frame 205 depicted here, the region 207 is not Space Division multiple access (non-SDMA region) and is organized in a manner similar to the OFDMA downlink sub-frame 105 depicted in FIG. 1. In the uplink frame 210 depicted in FIG. 2, the region 217 is a non-SDMA region and is similar in its organization to the uplink sub-frame 110 from FIG. 1.

The regions 215 in the downlink frame and the regions 220 in the uplink frame are Space Division multiple access. The properties of advanced antenna systems (AAS) allow multiple OFDMA regions of the airlink to be transmitted or received in overlapped time and/or frequency regions of an airlink. Thus, each region 215 of the downlink frame is a Space Division multiple access (or AAS) region (SDMA region), and occurs in the same two dimensional frequency and time region. Similarly the uplink airframe in an OFDMA scheme with SDMA may have an SDMA region with SDMA sub-regions corresponding to the different Space Division multiple access communications overlapped in frequency and/or time as depicted at 220.

It should be clear that the above described depictions of airlink frame organization are merely exemplary. Other embodiments may differ. For example, the specific layout of sub-frames depicted may vary from embodiment to embodiment, including the location in terms of frequency and time of a management region or data region. The non-Space Division multiple access regions depicted in FIG. 2 may not be present in some embodiments. In the embodiments depicted in the figure, two layers of space-division multiple access regions are shown overlapped with the regions visible in the figure. In other embodiments, one or more layers of such overlapped regions may occur depending on the nature of the advanced antenna system deployed in the embodiment. In some embodiments, Space Division multiple access regions may only be used for uplink transmission; in others only for downlink. Many other organizational approaches are possible.

In executing the MAC protocol for an OFDMA implementation, a base station and/or participating clients must determine how the airlink frame is to be allocated to the various clients. As is illustrated by FIG. 1, the general problem of scheduling OFDMA clients into regions within an airlink sub-frame is a two-dimensional scheduling problem, where each region for a given client is scheduled into a time slot and a frequency sub-channel to obtain its region within the airlink frame as depicted in the figure. This type of problem for OFDMA is known in the art and the known solutions utilize solutions to an analogous well known problem, the bin-packing problem. As is known, the bin-packing problem is NP-complete, which means that algorithmic solutions to the OFDMA scheduling problem that provide acceptably good schedules in terms of bandwidth may be computed in a reasonable time, though reliably computing a maximally optimal arrangement is not feasible in a reasonable time.

The addition of AAS to an OFDMA network such as in the 802.16 case adds a third dimension to the airlink allocation problem. As may be seen from the embodiment depicted in FIG. 2 and described above, not only do clients need to be scheduled into regions within a two dimensional OFDMA airlink sub-frame, they also need to be scheduled across space-division multiple access regions that may overlap with other Space Division multiple access regions in the frequency and time dimensions. In general, clients that interfere with each other should not be scheduled at the same time and in the same frequency sub-channel, while clients that are able to transmit or receive data at the same time and over the same sub-channel because of the AAS capability may be scheduled in overlapping regions of the SDMA portion of the airlink frame. This is therefore a three dimensional scheduling problem, which adds significant complexity to the previously described scheduling problem in the simpler OFDMA-only case.

In one embodiment, the general three dimensional scheduling problem created by AAS enabled networks with OFDMA and SDMA may be reduced to a set of two dimensional problems by separating the problem of scheduling of clients into higher level SDMA and non-SDMA regions based on their co-interference, from the problem of scheduling clients into their final allocation to lower-level regions defined by frequency sub-channels and time slots, which is standard OFDMA allocation. While in general, all AAS-capable clients in such a network could be compared against each other to determine the best possible schedule, a single static placement is not possible even if clients are not mobile (as may be the case in 802.16 embodiments), in part because the system may be over-subscribed, and in part because each client may have differing bandwidth needs at different times. Thus, the schedule for AAS-capable clients must be recomputed periodically. However, inter-client interference, which is a key factor in determining the scheduling of AAS-capable clients, changes over a period that is much longer than the duration of each frame. Thus it is possible to split the computation of the schedule for the airlink frame into two parts: a portion to improve the inter-client SDMA interference for AAS-capable clients, which allocates clients to higher level regions and runs less often than the two-dimensional OFDMA schedule that must be computed for each frame which must therefore be computed once each frame duration.

In the embodiment, an algorithm first allocates clients into regions based at least in part on co-interference between clients. The regions are further divided into Space Division multiple access and non-Space Division multiple access regions. For example, in one embodiment, the algorithm may allocate clients into multiple SDMA frames and a single non-SDMA frame as depicted in FIG. 2. The algorithm creates data structures for virtual regions, termed buckets, to represent the various regions. Thus, one bucket may represent the non-SDMA region, and other buckets, in general a plurality, may represent the SDMA regions. Once clients are allocated to a bucket representing a region, they are then further scheduled within the corresponding region using a standard OFDMA scheduling algorithm. Thus, clients in any one bucket, that is, clients in any one SDMA frame or in the non-SDMA frame, will not co-interfere because they are scheduled at different times and/or different frequency sub-channels, while clients placed in different SDMA frames may interfere with each other. Because no frames are scheduled concurrently with the non-SDMA frame, no client placed in the non-SDMA frame will cause co-interference with any other client. It is also important that all clients get a fair share of the bandwidth.

This set of observations provides a basic goal for the placement of clients into the buckets: first, to lower the total co-interference within the system, and second, to place all the clients into the frames fairly, so that the allocated bandwidth in each bucket is approximately the same as in any other bucket (fairness within each bucket is a goal for the subsequent standard OFDMA scheduling process that follows this periodic allocation into sub-regions). To minimize the co-interference of the system as a whole, the algorithm should place clients with high co-interference into the same sub-region, or bucket representing the sub-region; and the worst co-interferers, that is, clients which have high average co-interference with all other clients, should be placed in the non-SDMA region. As a practical matter, the determination of which clients have high co-interference may be done by parameterization, where a maximum co-interference value is selected as a parameter to the algorithm and a recorded co-interference above this maximum value is considered high. This should however be done only for as small a number of clients as possible because clients placed in this region cannot take advantage of SDMA and thus of the AAS capability of the system.

While the problem described above describes an algorithmic approach to an embodiment of the scheduling problem for SDMA networks, many variations are possible. For example, the actual data structure used to represent regions may differ in different embodiments. The term "bucket" is a generic term for a virtual region used for convenience in description. In actual implementation a bucket may be an array, linked list, data set or bag, or one of many other types of data structures or classes as is known in the art. As indicated previously, a particular implementation may have two or more non-SDMA frames instead of just one. The frequency with which the placement algorithm is run may vary in different embodiments, depending on the dynamism of the network requirements of the clients and other factors. Many other variations are possible.

A simulated annealing (SA) approach is used to achieve the goal of reducing co-interference of the system, while retaining a measure of fairness across regions in performing the periodic allocation of clients to regions described above. Simulated annealing is a well-known technique, not described in detail here, that is used to obtain reasonably good solutions to optimization problems and often yields acceptably good solutions to NP-hard optimization problems such as the scheduling problem described here. As is known in the art, a simulated annealing algorithm uses a measure of simulated system energy and generates new configurations of the system based on a simulated system temperature, depending on the energy, and a chosen constant, until an energy minimum is reached. As is known, each new configuration is chosen based on random variation limited by the amount of simulated energy variation permitted by the current simulated temperature of the system, until the system's simulated energy can be reduced no further. The choice of a method for computing the simulated system energy depends on the system characteristic that is sought to be minimized.

In one embodiment, a configuration of an AAS-capable wireless network system is represented by allocation of clients to buckets representing regions, and the simulated system energy for simulated annealing is based on a set of evaluation functions that compute the energy of the system by considering pair-wise interference between clients, bandwidth, and the type of region represented by a bucket. In general, the evaluation function for a bucket depends on the co-interference of clients in the bucket with other clients; on the total bandwidth allocated to the bucket; and on the number of clients in the bucket, if it represents a non-SDMA region.

The evaluation function for two clients that are placed in separate buckets, both of which represent an SDMA region, returns a value linearly proportional to the co-interference between them. The function for two clients in the same bucket, if the bucket represents an SDMA region, returns zero because two clients in the same bucket will be scheduled in non-overlapping OFDMA regions. The function for two clients, if one of them is placed in a bucket representing a non-SDMA region, yields a value depending on the number of clients already placed in the region, chosen to fairly allocate the worst co-interferers to the non-SDMA region while minimizing the total number allocated to the non-SDMA region. Finally, clients placed in buckets that already have large cumulative bandwidth totals from the clients in the bucket will have an evaluation function that causes them to contribute more energy to the system.

Figure 3:
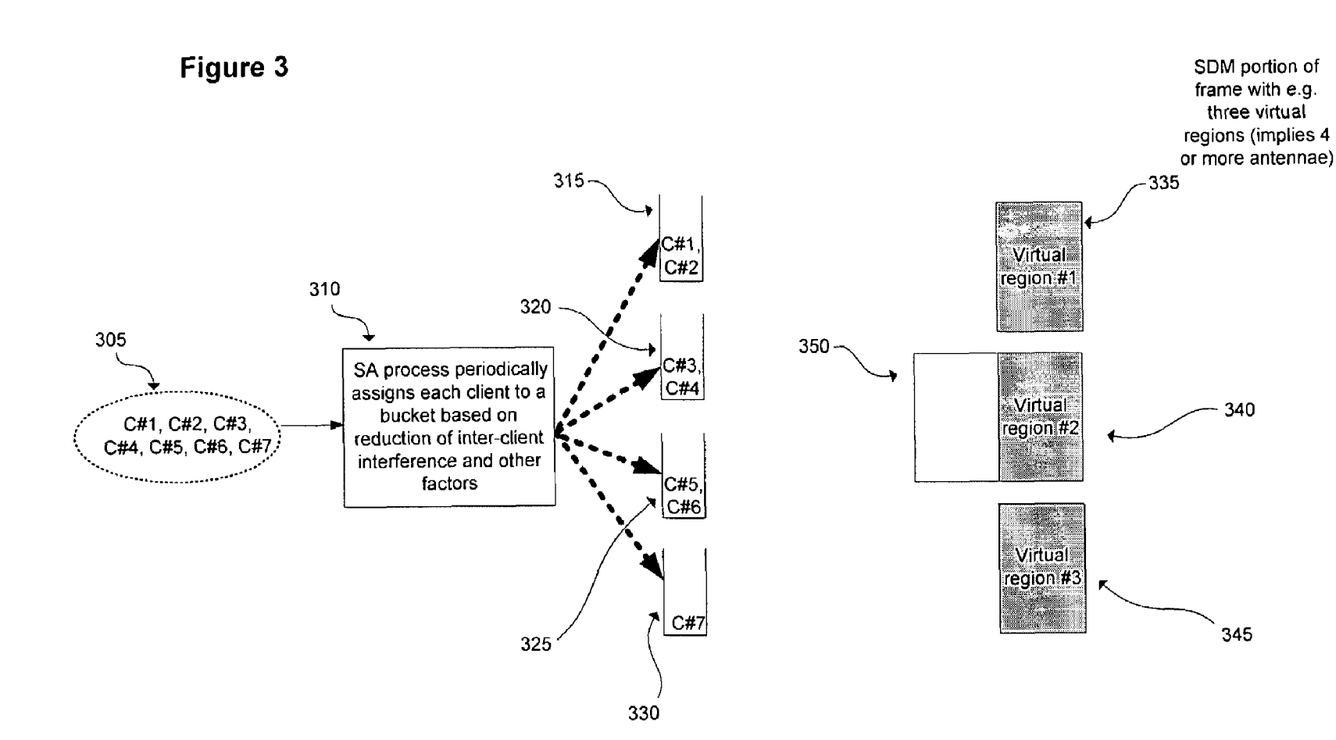
FIG. 3 depicts a representation of the simulated annealing process for allocation of clients to regions in one embodiment.

FIG. 3 depicts the overall organization of the process described above. Clients 305, in this exemplary embodiment represented as C#1 through C#7, are periodically assigned to a bucket or virtual region by a simulated annealing process (SA) 310, based on evaluation functions as described above. Buckets 320, 325 and 330 represent SDMA regions 335, 340 and 345, and bucket 315 represents non-SDMA region 350. Thus, after the execution of the simulated annealing process at 310, clients 1 and 2 (C#1 and C#2) are allocated to the bucket representing the non-SDMA region 350; clients 3 and 4 are allocated to the bucket 320 representing region 1 335, and similarly for the other buckets 325 and 330.

Once the allocation of clients to buckets is completed, per-sub-frame scheduling of clients from each bucket may be done in a standard way as is done for OFDMA sub-frames. Thus the problem of 3-dimensional, SDMA co-interference-aware OFDMA scheduling is reduced to the well understood bin-packing problem inherent in OFDMA, while still retaining fairness and reducing co-interference.

Figure 4:
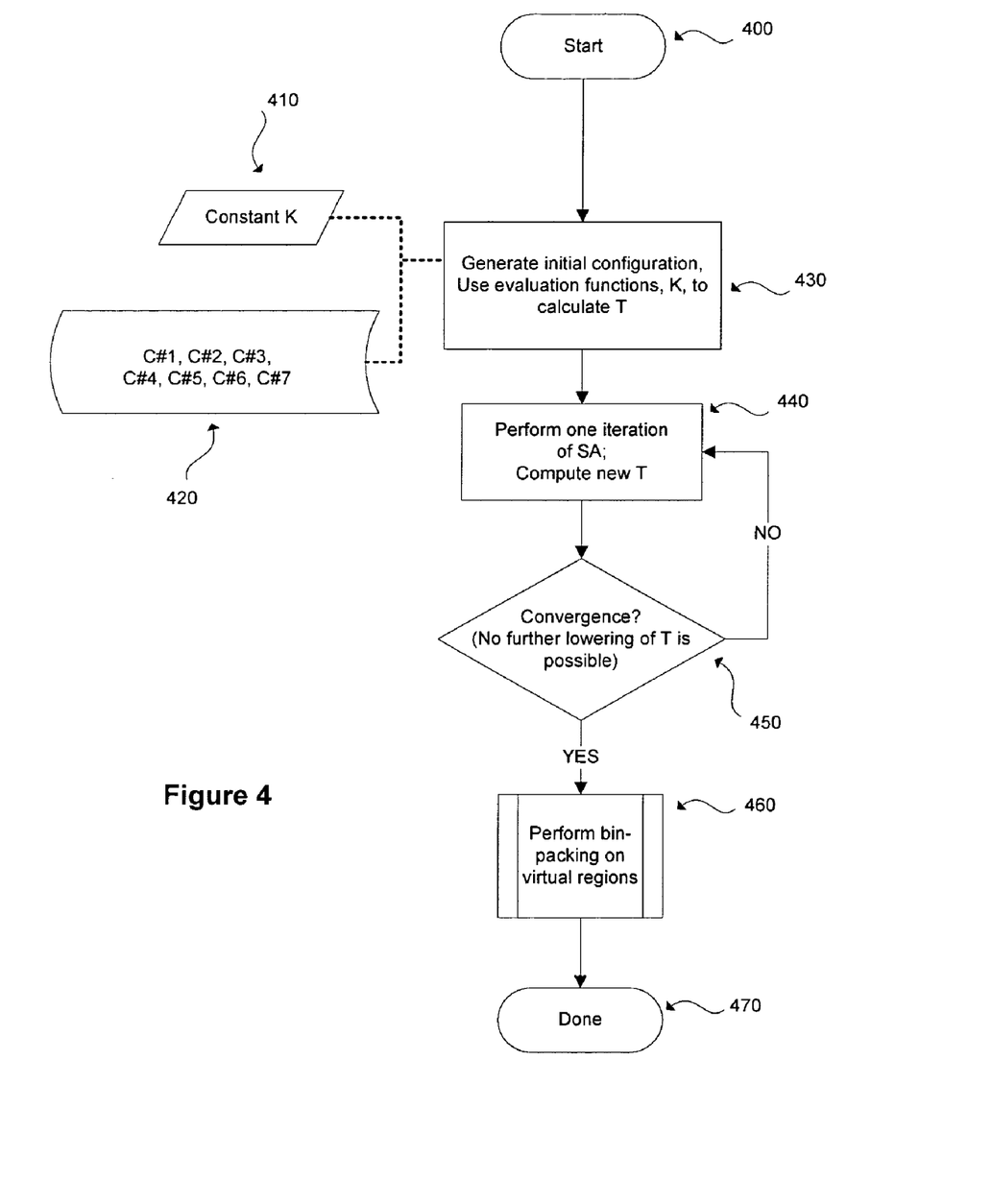
FIG. 4 depicts a high level flowchart for the process of allocating clients to regions.

The flowchart in FIG. 4 depicts this process in one embodiment at a high level. After starting, 400, the process generates an initial configuration in preparation for simulated annealing, 430. This configuration consists of an allocation of clients 420 to a set of buckets as discussed above. The simulated energy of the system for simulated annealing then may be calculated based on evaluation functions based on co-interference, fairness, and other factors. A detailed description of simulated energy calculation is discussed below. Using the simulated energy and a chosen constant K, a system temperature is calculated in the manner known in the art, 430. The iterative process of simulated annealing then proceeds, 440, generating new configurations and repeating the process until no new configurations are generated with lower energies, that is, a minimum energy configuration is reached. This arrangement of the clients in their buckets corresponding to virtual regions then may be passed to the standard two-dimensional OFDMA per-sub-frame bin-packing computation 460 which is performed as known in the art to achieve a final airlink allocation to clients.

In one embodiment, a function to calculate the simulated energy based on co-interference between two subscribers may be computed as follows. Table 1 lists variables and elementary functions with definitions that are used in computing the simulated energy function.

TABLE 1

| | |
|---|---|
| n | is the number of clients in a wireless network |
| m | is the number of buckets corresponding to virtual regions |
| $C_i$ | is client number i, i between 1 and n. |
| $A(C_i)$ | is the relative angle of client number i. This is a value the underlying hardware implementation of the physical airlink (PHY layer) reports for each client, as is known in the art. Clients reporting nearly the same angle will have more co-interference with each other than clients with more widely different angles. |
| $B_k$ | Bucket number k between 0 and m. As described above, the number of buckets corresponds to the number of virtual regions realized via SDMA. In one exemplary embodiment, that is in a four antenna system, k might take a value from 1-3 (typically, the number of virtual regions possible at least one less than the number of antennae). $B_0$ is a reserved value to indicate the non-SDMA region of the frame. |
| $BW(B_k)$ | is a function that returns the sum of the bandwidth of the set of subscribers that are already assigned to bucket k. |
| $K_{ns}$ | is a constant used to multiply energy in the non-SDMA region of the frame. A higher value here will bias more clients into the SDMA regions of the frame. |
| $K_s$ | is a constant used to multiply energy in the SDMA region of the frame. A higher value here will bias clients out of the SDMA regions of the frame. |
| $E(C_i, B_k, C_j, B_h)$ | is a function returns the calculated co-interference energy between two clients $C_i$ and $C_j$ if placed into buckets $B_k$ and $B_h$ respectively. |

Table 2 depicts pseudocode representing processing in one embodiment used to calculate the value of the function E listed above.

TABLE 2

```
Compute E(C_i, B_k, C_j, B_h)
  If (k equals h and neither equals 0) return K_s * BW(B_k)
  /* The two clients are in the same SDMA bucket, so they have no
     co-interference, but they do contribute energy to the system as
     a function of the amount of bandwidth already in the bucket
     multiplied by the energy constant associated with being in an
     SDMA bucket */
  If (k equals 0 and h does not equal 0) return K_ns * BW(B_0) + C_s *
  BW(B_h)
  /* The first client is in the non-SDMA bucket, so they have no
     co-interference but they do contribute energy into the system
     as a function of the amount of bandwidth already in the
     non-SDMA bucket, multiplied by the energy constant associated
     with being in the non-SDMA portion of the frame. */
  If (k does not equal 0 and h equals 0) return K_ns * BW(B_0) + K_s *
  BW(B_k)
  /* The second client is in the non-SDMA bucket, so they have no
     co-interference but they do contribute energy into the system
     as a function of the amount of bandwidth already in the
     non-SDMA bucket, multiplied by the energy constant associated
     with being in the non-SDMA portion of the frame. */
  If (k equals 0 and h equals 0) return 2 * K_ns * BW(B_0)
  // Both clients are in the non-SDMA bucket, so they have no
  co-interference but they
  // do contribute energy into the system as a function of the amount
  of bandwidth already
  // in the non-SDMA bucket, multiplied by the energy constant
  associated with being in the
  // non-SDMA portion of the frame.
  Otherwise return (A(C_i) − A(C_j)) * (K_s * BW(B_k) + K_s * BW(B_h))
  // Both clients are different SDMA buckets and may co-interfere. The
  amount of energy to
  // return is a function of the amount of bandwidth in each bucket they
  are in, multiplied by
  // the level of co-interference we predict between the two client based
  on the relative angles
  // detected by the airlink hardware.
```

As indicated earlier, while the description above is based on one embodiment, which is implemented as part of the base station operation in an 802.16 network, many other variations are possible in other embodiments. For example, the protocol may be executed by clients and the base station in co-operation with or by another device such as a computing node on the network. The specific choices of the evaluation functions for calculation of the simulated energy may vary, and in some instances may ignore parameters such as fairness discussed above, and in others add additional parameters to the allocation problem. Many variations on the basic steps in the simulated annealing process exist, as is known in the art, and may be utilized in other embodiments. The processing above may be altered, for example, if certain clients are known to be fixed in location and/or their bandwidth requirements.

In the preceding description, for purposes of explanation, numerous specific details are set forth in order to provide a thorough understanding of the described embodiments, however, one skilled in the art will appreciate that many other embodiments may be practiced without these specific details.

Some portions of the detailed description above are presented in terms of algorithms and symbolic representations of operations on data bits within a processor-based system. These algorithmic descriptions and representations are the means used by those skilled in the art to most effectively convey the substance of their work to others in the art. The operations are those requiring physical manipulations of physical quantities. These quantities may take the form of electrical, magnetic, optical or other physical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

In the description of the embodiments, reference may be made to accompanying drawings. In the drawings, like numerals describe substantially similar components throughout the several views. Other embodiments may be utilized and structural, logical, and electrical changes may be made. Moreover, it is to be understood that the various embodiments, although different, are not necessarily mutually exclusive. For example, a particular feature, structure, or characteristic described in one embodiment may be included within other embodiments.

Further, a design of an embodiment that is implemented in a processor may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) that constitute or represent an embodiment.

Embodiments may be provided as a program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a program product, wherein the program may be transferred from a remote data source to a requesting device by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the claimed subject matter but to illustrate it. The scope of the claimed subject matter is not to be determined by the specific examples provided above but only by the claims below.

What is claimed is:

1. In a wireless network comprising a plurality of clients, at least one base station with which the clients may communicate, and a media access control protocol layer supporting at least Orthogonal Frequency Division Multiple Access and Space Division Multiple Access, a method comprising:
   executing a simulated annealing process to lower a simulated system energy of the wireless network, the simulated system energy based at least in part on reported co-interference between a pair of clients; and
   computing an allocation of a client of the wireless network to a sub frame of an air link frame of the wireless network, the sub frame including a time slot and a sub-channel frequency range, the allocation based at least in part on a result of the simulated annealing process.

2. The method of claim 1 wherein executing a simulated annealing process further comprises allocating both members of a pair of clients with recorded co-interference above a first value to a single sub frame in a Space Division multiple access region of the airlink frame.

3. The method of claim 2 wherein executing a simulated annealing process further comprises allocating a client with an average reported co-interference relative to other clients above a second value, to a region of the airlink frame that is not Space Division multiple access.

4. The method of claim 3 wherein the wireless network further comprises an advanced antenna system capable client and an advanced antenna system capable base station, each further capable of supporting Space Division Multiple Access.

5. The method of claim 3 wherein executing the simulated annealing process further comprises allocating a client to one of a plurality of buckets, each bucket representing a region of the airlink frame, and calculating the simulated system energy of the wireless network based at least in part on the clients allocated to the buckets.

6. The method of claim 5 further comprising determining the simulated system energy contribution of a pair of clients based at least in part on one or more of:
   the reported co-interference factor of the pair if they are in different buckets;
   a zero co-interference factor if they are in the same bucket and the bucket represents a sub frame in a Space Division multiple access region of the airlink frame;
   the total bandwidth already allocated to the bucket in which each client is located; and
   a value dependent on the number of clients allocated to the bucket representing a non Space Division multiple access of the airlink frame if they are in the same bucket and the bucket represents a non Space Division multiple access region of the airlink frame.

7. In a wireless network comprising a plurality of clients, at least one base station with which the clients may communicate, and a media access control protocol layer supporting at least Orthogonal Frequency Division Multiple Access and Space Division Multiple Access, a method comprising:
   periodically computing an allocation of clients of the wireless network to virtual regions of an airlink frame at an interval at least as long as a plurality of frame durations,
   wherein periodically computing an allocation of clients of the wireless network to virtual regions of an airlink frame at an interval at least as long as a plurality of frame durations further comprises
   executing a simulated annealing process to lower a simulated system energy of the wireless network, the simulated system energy based at least in part on reported co-interference between a pair of clients; and
   computing the allocation of a client of the wireless network to the virtual regions based at least in part on a result of the simulated annealing process.

8. The method of claim 7 further comprising calculating the final allocation of clients to lower level regions at an interval no longer than a frame duration.

9. A base station of a wireless network comprising:
   an antenna system capable of supporting Space Division Multiple Access; and
   a protocol execution component to support at least Orthogonal Frequency Division Multiple Access and Space Division Multiple Access of the wireless network airlink;
   to execute a simulated annealing process to lower a simulated system energy of the wireless network, the simulated system energy based at least in part on reported co-interference between a pair of wireless network clients; and
   to compute an allocation of a client of the wireless network to a region within a sub frame of an airlink frame of the wireless network, the sub frame including a time slot and a sub-channel frequency range, the allocation based at least in part on a result of the simulated annealing process.

10. The base station of claim 9 wherein the protocol execution component is further to allocate both members of a pair of clients with recorded co-interference above a first value to a single region in a Space Division multiple access region of the airlink frame.

11. The base station of claim 10 wherein the protocol execution component is further to allocate a client with an average reported co-interference relative to other clients above a second value, to a region of the airlink frame that is not Space Division multiple access.

12. The base station of claim 11 wherein the protocol execution component is further to allocate a client to one of a plurality of buckets, each bucket representing a region of the airlink frame, and calculating the simulated system energy of the wireless network based at least in part on the clients allocated to the buckets.

13. The base station of claim 12 wherein the protocol execution component is further to determine the simulated system energy contribution of a pair of clients based at least in part on one or more of:
   the reported co-interference factor of the pair if they are in different buckets;
   a zero co-interference factor if they are in the same bucket and the bucket represents a region in a Space Division multiple access region of the airlink frame;
   the total bandwidth already allocated to the bucket in which each client is located; and
   a value dependent on the number of clients allocated to the bucket representing a non Space Division multiple access of the airlink frame if they are in the same bucket and if the bucket represents a region of the airlink frame that is not Space Division multiple access.

14. A base station of a wireless station comprising:
   an antenna system capable of supporting Space Division Multiple Access; and
   a protocol execution component to periodically compute an allocation of clients of the wireless network to virtual regions of an airlink frame at an interval at least as long as a plurality of frame durations
   wherein the protocol execution component is further to
   execute a simulated annealing process to lower a simulated system energy of the wireless network, the simulated system energy based at least in part on reported co-interference between a pair of clients; and
   to compute the allocation of a client of the wireless network to a virtual region based at least in part on a result of the simulated annealing process.

15. The base station of claim 14 wherein the protocol execution component is further to calculate the final allocation of clients to lower-level regions at an interval no longer than a frame duration.

16. A wireless network comprising:
   a base station with an antenna system capable of supporting Space Division Multiple Access
   a plurality of clients with an antenna system capable of supporting Space Division Multiple Access; and
   a protocol execution component in one or more of the base station and the plurality of clients,
   to support at least Orthogonal Frequency Division Multiple Access and Space Division Multiple Access of the wireless network airlink;
   to execute a simulated annealing process to lower a simulated system energy of the wireless network, the simulated system energy based at least in part on reported co-interference between a pair of wireless network clients; and
   to compute an allocation of a client of the wireless network to a region within a sub frame of an airlink frame of the wireless network, the sub frame including a time slot and a sub-channel frequency range, the allocation based at least in part on a result of the simulated annealing process.

17. The wireless network of claim 16 wherein the protocol execution component is further to allocate both members of a pair of clients with recorded co-interference above a first value to a single region in a Space Division multiple access region of the airlink frame.

18. A wireless network comprising:
   an antenna system capable of supporting Space Division Multiple Access; and
   a protocol execution component to periodically compute an allocation of clients of the wireless network to virtual regions of an airlink frame at an interval at least as long as a plurality of frame durations
   wherein the protocol execution component is further
   to execute a simulated annealing process to lower a simulated system energy of the wireless network, the simulated system energy based at least in part on reported co-interference between a pair of clients; and
   to compute the allocation of a client of the wireless network to a virtual region based at least in part on a result of the simulated annealing process.

19. The wireless network of claim 18 wherein the protocol execution component is further to comprising calculating the allocation of clients to regions within each sub frame at an interval at least as long as a frame duration.

20. A client of a wireless network comprising:
   an antenna system capable of supporting Space Division Multiple Access; and
   a protocol execution component in the client to participate in a protocol executed at least in part by a base station of the wireless network and the client, the protocol to support at least Orthogonal Frequency Division Multiple Access and Space Division Multiple Access of the wireless network airlink;
   to execute a simulated annealing process to lower a simulated system energy of the wireless network, the simulated system energy based at least in part on reported co-interference between a pair of wireless network clients; and
   to compute an allocation of a client of the wireless network to a region within a sub frame of an airlink frame of the wireless network, the sub frame including a time slot and a sub-channel frequency range, the allocation based at least in part on a result of the simulated annealing process.

21. The client of claim 20 wherein the protocol is further to allocate both members of a pair of clients with recorded co-interference above a first value to a single region in a Space Division multiple access region of the airlink frame.

22. A client of a wireless network comprising:
   an antenna system capable of supporting Space Division Multiple Access; and
   a protocol execution component in the client to participate in a protocol executed at least in part by a base station of the wireless network and the client, the protocol to periodically compute an allocation of clients of the wireless network to virtual regions of an airlink frame at an interval at least as long as a plurality of frame durations
   wherein the protocol is further to
   execute a simulated annealing process to lower a simulated system energy of the wireless network, the simulated system energy based at least in part on reported co-interference between a pair of clients; and to compute the allocation of a client of the wireless network to a virtual region based at least in part on a result of the simulated annealing process.

23. A machine readable medium having stored thereon data that when accessed by a machine causes the machine to perform a method, the method comprising:

executing a simulated annealing process to lower a simulated system energy of a wireless network, the network comprising a plurality of clients and at least one base station with which the clients may communicate; and a media access control protocol layer supporting at least Orthogonal Frequency Division Multiple Access and Space Division Multiple Access, the simulated system energy based at least in part on reported co-interference between a pair of clients; and computing an allocation of a client of the wireless network to a region within a sub frame of an air link frame of the wireless network, the sub frame including a time slot and a sub-channel frequency range, the allocation based at least in part on a result of the simulated annealing process.

24. The machine readable medium of claim 23 wherein executing a simulated annealing process further comprises allocating both members of a pair of clients with recorded co-interference above a first value to a single region in a Space Division multiple access region of the airlink frame.

25. A machine readable medium having stored thereon data that when accessed by a machine causes the machine to perform a method, the method comprising:

in a wireless network comprising a plurality of clients and at least one base station with which the clients may communicate, and a media access control protocol layer supporting at least Orthogonal Frequency Division Multiple Access and Space Division Multiple Access, periodically computing an allocation of clients of the wireless network to virtual regions of an airlink frame at an interval at least as long as a plurality of frame durations, wherein periodically computing an allocation of clients of the wireless network to virtual regions of an airlink frame at an interval at least as long as a plurality of frame durations further comprises:

executing a simulated annealing process to lower a simulated system energy of the wireless network, the simulated system energy based at least in part on reported co-interference between a pair of clients; and computing the allocation of a client of the wireless network to the virtual region based at least in part on a result of the simulated annealing process.

* * * * *

UNITED STATES PATENT AND TRADEMARK OFFICE
CERTIFICATE OF CORRECTION

PATENT NO. : 7,586,890 B2  Page 1 of 1
APPLICATION NO. : 11/134650
DATED : September 8, 2009
INVENTOR(S) : David M. Putzolu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1022 days.

Signed and Sealed this

Twenty-first Day of September, 2010

David J. Kappos
*Director of the United States Patent and Trademark Office*